United States Patent [19]

Hatch et al.

[11] Patent Number: 4,691,094
[45] Date of Patent: Sep. 1, 1987

[54] PLASMA-ARC TORCH WITH SLIDING GAS VALVE INTERLOCK

[75] Inventors: Bruce O. Hatch, Lebanon; Richard A. Spaulding, Hanover, both of N.H.

[73] Assignee: Thermal Dynamics Corporation, West Lebanon, N.H.

[21] Appl. No.: 865,256

[22] Filed: May 20, 1986

[51] Int. Cl.[4] .................................... B23K 15/00
[52] U.S. Cl. .................... 219/121 PR; 219/121 PP; 219/121 PM; 219/121 PQ
[58] Field of Search ............ 219/121 P, 121 PM, 74, 219/75, 76.16, 121 PQ, 121 PP, 121 PU; 313/231.21, 231.31, 231.41

[56] References Cited

U.S. PATENT DOCUMENTS

| | | | |
|---|---|---|---|
| 4,257,450 | 3/1981 | Ollivier | 137/505 |
| 4,450,858 | 5/1984 | Acomb | 137/505.37 |
| 4,489,751 | 12/1984 | Acomb et al. | 137/505.36 |
| 4,516,595 | 5/1985 | Acomb | 137/73 |
| 4,558,201 | 12/1985 | Hatch | 219/121 PQ |
| 4,580,032 | 4/1986 | Carkhuff | 219/121 PU |
| 4,585,921 | 4/1986 | Wilkins et al. | 219/121 PP |
| 4,590,354 | 5/1986 | Marhic et al. | 219/121 PQ |

*Primary Examiner*—M. H. Paschall
*Attorney, Agent, or Firm*—Majestic, Gallagher, Parsons & Siebert

[57] ABSTRACT

A plasma-arc torch includes an interlock in the form of a sliding gas valve which permits interruption of torch operation by closing off fluid flow through the torch when necessary parts such as the electrode, tip, fluid distributor, and/or cup are not in place.

10 Claims, 6 Drawing Figures

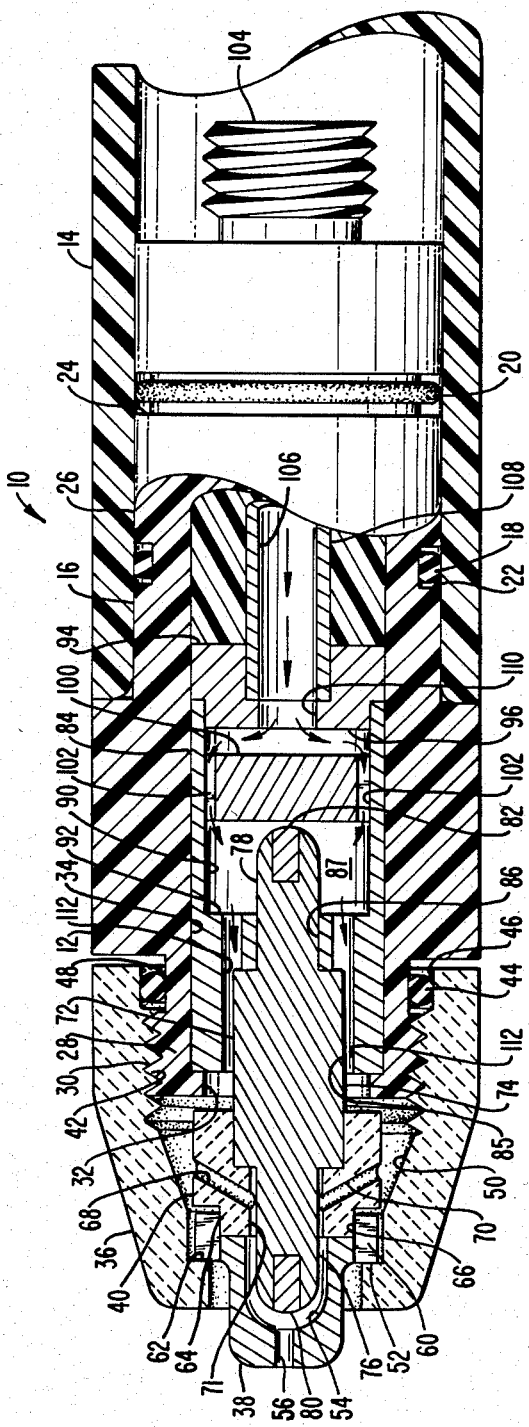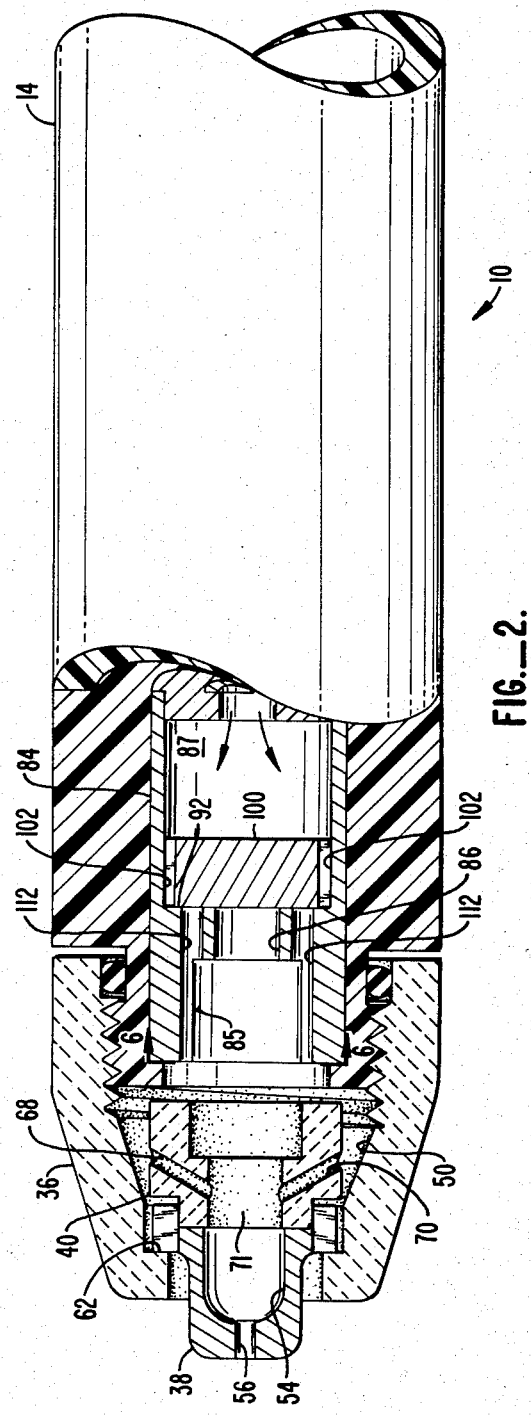

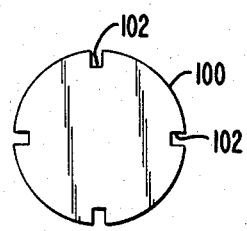
FIG._3.
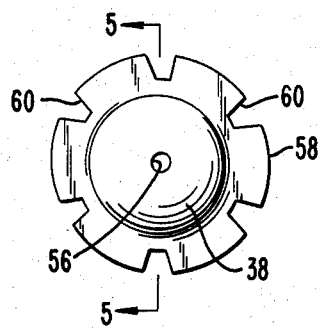
FIG._4.
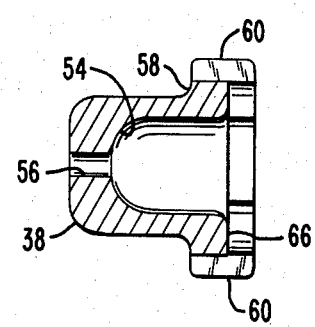
FIG._5.
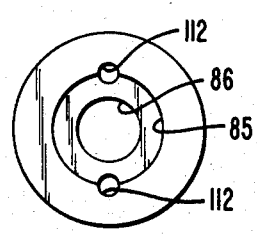
FIG._6.

PLASMA-ARC TORCH WITH SLIDING GAS VALVE INTERLOCK

BACKGROUND OF THE INVENTION

1. Field of the Invention

This invention is directed to an interlock device for preventing the operation of a plasma-arc cutting system when necessary parts are not in place. It relates specifically to a plasma-arc torch having a sliding gas valve that interrupts the flow of gas or other working fluid through the torch when essential parts are missing. The interruption of gas flow may be sensed by a flow switch and power to the torch is cut off.

2. Description of the Prior Art

Plasma-arc torches find wide application to tasks such as cutting, welding and spray bonding. These torches operate by directing a plasma consisting of ionized gas particles toward a workpiece.

In the operation of a typical plasma-arc torch, such as illustrated in U.S. Pat. Nos. 4,324,971; 4,170,727; and 3,813,510, assigned to the same assignee as the present invention, a gas to be ionized is supplied to the front end of the torch in front of a negatively-charged electrode. The torch tip, which is adjacent to the end of the electrode at the front end of the torch, has a sufficiently high voltage applied thereto to cause a spark to jump between the electrode and torch tip, thereby heating the gas and causing it to ionize. A pilot DC voltage between the electrode and the torch tip maintains an arc known as the pilot, or non-transferred arc. The ionized gas in the gap appears as a flame and extends externally off the tip where it can be seen by the operator. As the torch head or front end is brought down towards the workpiece, the arc jumps from the electrode to the workpiece since the impedance of the workpiece current path is lower than the impedance of the torch tip current path.

The gas or working fluid is supplied through a conduit from a source of fluid under pressure to the torch tip. Frequently, a secondary flow of fluid is provided which passes through a separate flow path from the first mentioned working fluid for purposes of cooling various torch parts. In this case, the first mentioned fluid is called the primary fluid or gas and the second is called the secondary fluid or gas.

Because the electrode and tip operate in a very high temperature environment, they must be replaced from time to time as they are used up. Accordingly, torches are design to facilitate periodic replacement of these electrodes and tips as well as other parts.

Sometimes, because of operator carelessness perhaps, a tip, electrode or other essential torch part is left off the torch during replacement and not present when the torch is operated. This may cause operator injury. It can also cause damage to the torch. For example, if the tip is not in place the arc generated from the electrode may strike and damage another part of the torch.

The assignee's own U.S. patent application Ser. No. 515,950 filed July 20, 1983, now U.S. Pat. No. 4,585,921 issued Apr. 29, 1986 entitled "Torch Operation Interlock Device," describes an electrical circuit means that functions as an operation interlock when torch parts are not in place. If a sensed part is not in place, the control circuit functions to interrupt operation of the torch, thereby attempting to minimize operator injury and torch damage.

Applicant's assignee is also the owner of two other U.S. patent applications, Ser. Nos. 794,288 and 794,389 filed on Nov. 4, 1985, entitled "Electrode Exposure Interlock Device with Pressure Sensing" and "Electrode Exposure Interlock Device with Flow Sensing," respectively. These devices operate on pressure and flow rate. They use changes in pressure and flow rate of the working fluid to indicate the absence of necessary parts and thereby prevent unwanted operation of the torch.

While a satisfactory solution to the torch parts in place problem, applicant's assignee's prior art devices require more complex construction. The first named device requires a complex electrical circuit. A current path must be established through the parts or parts to be retained. This requires at least one additional wire to form a circuit. Such a circuit thus adds to cost as well as to complexity.

The latter two devices also require fluid or pressure control circuits as well as control systems. They are thus also more complex.

SUMMARY AND OBJECTS OF THE INVENTION

Applicants' instant invention attempts to solve the parts in place problem by providing a relatively simple mechanism for interrupting the flow of gas or other working fluid through the torch when essential parts are not in place. It does this by providing a sliding gas valve that shuts off gas flow when the subject parts are missing.

It is therefore the primary object of this invention to provide a means for preventing operation of a plasma-arc torch when necessary parts are not in place.

It is a further object to provide such a means in the form of an interlock device which is less complex, has fewer parts and therefore is less costly to produce than prior art devices.

Further and other objects and advantages will become more apparent by having reference to the accompanying drawings and the following detailed description and claims.

BRIEF DESCRIPTION OF THE DRAWINGS

FIG. 1 is a partial cross sectional view of the front part (torch head) of a plasma-arc torch illustrating the preferred embodiment of the invention;

FIG. 2 is a view of the same with a part in the form of an electrode removed so as to allow the operation of the invention;

FIG. 3 is a top plan view of the valve element;

FIG. 4 is a cross sectional elevational view of the torch tip of FIG. 1;

FIG. 5 is a left end elevation view of the same; and

FIG. 6 is a view taken along lines 6—6 in FIG. 2.

DETAILED DESCRIPTION

FIG. 1 is a partial cross-sectional view of a plasma-arc torch shown generally at 10. The torch is comprised of a generally cylindrical body 12 which may be made of plastic or other thermally and electrically non-conductive material. Extending from the rear portion of the body 12 is a handle portion 14 of tubular construction. Handle portion 14 may also be of a plastic or other thermally and electrically non-conductive material. Handle portion 14 is fitted to stepped rear portion 16 of body 12 by means of a pair of O-rings 18, 20 of rubber or other resilient material. The O-rings are contained within accommodating grooves 22, 24 within outer peripheral wall 26 of rear body portion 16.

Body 12 has at its front end a stepped front portion 28 having external threads 30 thereon. An opening 32 is located in front portion 28 and leads to an internal, cylindrical recess 34 extending through the body and into rear portion 16.

Mounted over opening 32 is a closure assembly comprised of a cup 36, a tip 38, and a fluid distributor 40 for a purpose to be hereinafter described.

Cup 36 is a generally cup-shaped member having internal threads 42 on the inner wall thereof which mate with threads 30. An O-ring seal 44 of rubber or other resilient material is fitted within a recess formed by inner wall 46 of cup 36 and outer wall 48 of front portion 28. Cup 36 defines an internal chamber 50 and an outlet opening 52 at the front end thereof. Cup 36 may be made of ceramic or other thermally and electrically non-conductive material.

As shown, cup 36 is of generally cylindrical shape within opening 52 of which is retained tip 38. Tip 38 defines an internal chamber 54 therein and an outlet opening or aperture 56 is contained within the forward-most portion of the tip and intercommunicates chamber 54 with the exterior of the tip. Tip 38 may be made of copper or other thermally and electrically conductive material.

Turning to FIGS. 4 and 5, it may be seen that tip 38 has a radially projecting flange 58 at the rear end thereof. Flange 58 has, in turn, a plurality of grooved passages 60 peripherally arranged therearound.

Returning to FIG. 1, peripheral flange 58 is dimensioned to fit within an accommodating groove 62 within the bottom end wall of the cup 36.

Fluid distributor 40 is of generally cylindrical construction, having a stepped forward portion 64 which mates with an accommodating annular groove 66 within the rear portion of tip 38. A pair of fluid passages 68, 70 are contained within fluid distributor 40 for a purpose to be hereinafter described. The fluid distributor 40 may be made of ceramic or other thermally and electrically non-conducting material.

An electrode 72, which may be of the double-ended type shown, is retained by the front closure assembly, including cup 36, tip 38, and fluid distributor 40.

As may be seen, the electrode comprises a generally cylindrical body portion 74 and a pair of stepped opposite ends 76, 78. Electrode 74 is symmetrical about not only its central axis, but also end to end. Electrode 72 may be made of copper or other thermally and electrical conductive material. An insert 80, 82 is contained within the respective opposite end 80, 82 of electrode 72.

The electrode is, in turn, mounted within a valve body 84 of generally cylindrical construction, which is fitted within recess 34. The valve body 84 may be of copper or other electrically and thermally conductive material. Body 74 and end 82 of electrode 72 are mounted within axially disposed, stepped apertures 85, 86 of valve body 84 within the operative position shown in this figure. Valve body 84 also includes an internal valve chamber 87 of cylindrical shape defining a radial outer wall 90 and a forward end wall 92. A generally cylindrical plug 94 closes off the rear end of the valve body and defines a rear end wall 96.

A valve element 100 of generally cylindrical construction is slidably contained within chamber 98, and is otherwise movable from rear end wall 96 to forward end wall 92 but for the presence of end 82 of electrode 72.

As seen in FIG. 3, the valve element 100 contains a plurality of peripherally arranged slots 102 therethrough. Returning to FIG. 1, under normal operation, working fluid from a source (not shown) enters the torch through inlet 104. It then passes in the arrow direction through a passage 106 in an inlet tube 108 and thence through a centrally disposed aperture 110 in plug 94, and thence into valve chamber 98. Fluid then flows through passages 102 in valve element 100 and through a plurality of passages 112 in valve body 84. From there the working fluid exits through opening 32 and into chamber 50.

At this point, the portion of the fluid will continue on through grooves 60 and through outlet 52 to thereby cool the external surface of tip 38. The remaining portion of the working fluid will be directed through passage 68, 70 and central bore 71 in fluid distributor 40 to cool end 76 of electrode 74. It will then pass out through opening 56 in the end of the tip as a plasma fluid after being energized by the electrical arc maintained between the insert 80 and the workpiece (not shown).

Turning now to FIG. 2, there is shown a view similar to FIG. 1 wherein a necessary part in the form of an electrode has been removed. Parenthetically, other parts could be removed in lieu of the electrode, such as: the cup 36, tip 38, or fluid distributor 40, or any combination of these.

As shown, fluid pressure enters chamber 87 and forces valve element 100 against forward end wall 92, thereby closing off flow through slots 102 in the valve element. The consequent cutting off of flow of the fluid is sensed by flow switch (not shown) upstream of the inlet and shuts off power so that the unit may not be turned on by the operator. In this manner, operation of the torch is prevented when necessary parts are missing. The lack of parts other than the electrode will also cause operation of the interlock. Obviously, when cup 36 is missing, the electrode will not be restrained from being expelled from the torch by means of gas pressure build-up in chamber 87. Even if it is present, tip 38, fluid distributor 40, and electrode 72 are dimensioned so that the absence of any one of these parts will result in a valve element 100 sealing against forward end wall 92.

For example, the absence of tip 38 will permit fluid distributor 40 to enter annular groove 62 in cup 36. The forward movement permitted to fluid distributor 40 by the absence of tip 38 is equal to or greater than the distance by which end 82 projects into chamber 87 when the electrode is in the operative position. A similar result obtains when fluid distributor 40 is missing and the remaining parts are in place. With any of these situations, the interlock will operate and the torch will not be able to be operated.

The above description is merely illustrative of the invention and various changes in shapes and sizes, materials, or other details are deemed to be within the scope of the appended claims.

We claim:

1. A plasma-arc torch comprising:
 a torch housing,
 an inlet and an outlet in said housing,
 passage means in said housing for conducting fluid from said inlet to said outlet, an electrode in said housing adapted to be in an operational position adjacent said outlet for generating an arc, a closure comprising retaining means removably connected to said housing for retaining said electrode in said housing, valve means in said housing operable to interrupt fluid flow from said inlet to said outlet when said retaining means is disconnected and removed from said housing, wherein said passage means includes a means defining a valve chamber therein and wherein said valve means comprises a valve element which is slidably movable within said valve chamber without the influence of any spring biasing means but only under the influence of fluid directed from said inlet to said outlet to selectively close or open fluid communication from said inlet to said outlet by way of said chamber.

2. The invention of claim 1 wherein said chamber is generally cylindrical, and wherein said valve element is also generally cylindrical and dimensioned and adapted for sliding movement within said chamber.

3. The invention of claim 2 wherein said chamber has a generally cylindrical sidewall portion and a pair of opposite end walls, means defining an opening in one of said end walls for communicating with said inlet means, means defining an opening in the other of said end walls for communicating with said outlet means.

4. The invention of claim 3 wherein said valve element includes a pair of opposite end walls and a cylindrical outer wall dimensioned so as to be in sliding engagement with said cylindrical sidewall portion of said valve chamber and further including passage means in said cylindrical outer wall for communicating fluid from one end to the other end of said valve element.

5. The invention of claim 4 wherein said electrode is dimensioned to project within said chamber when in its operational position thereby moving said valve element away from sealing engagement with said chamber end wall so as to open fluid communication from said inlet to said outlet by way of said passage means in said valve element.

6. The invention of claim 1 wherein said retaining means comprises a cup shaped element removably connectable to said housing, said cup shaped element having a means defining an opening therein.

7. The invention of claim 6 wherein said retaining means further comprises a tip element having an aperture therein for exiting of plasma fluid.

8. The invention of claim 7 wherein said retaining means further comprises a fluid distributor for directing fluid around said electrode.

9. The invention of claim 4 wherein said passage means comprise a plurality of spaced slots peripherally around said cylindrical outer wall, whereby fluid from said inlet is channeled to said outlet by way of passages formed by said slots and said inner wall of said valve chamber.

10. The invention of claim 7 wherein said cup, tip, fluid distributor and electrode are dimensioned so that the absence of any one of these parts from its normal connected position on the torch head said valve means will close off fluid communication to said outlet.

* * * * *